US005296060A

United States Patent [19]

Hanson et al.

[11] Patent Number: 5,296,060

[45] Date of Patent: Mar. 22, 1994

[54] DRYING A COATING OF SOLVENT-BASED ADHESIVE

[75] Inventors: Raymond Hanson, Rearsby; Malcolm Tillyard, Leicester, both of England

[73] Assignee: British United Shoe Machinery Limited, Leicester, England

[21] Appl. No.: 320,479

[22] Filed: Feb. 8, 1989

[30] Foreign Application Priority Data

Feb. 19, 1988 [GB] United Kingdom ................ 8803917

[51] Int. Cl.[5] ............................................ B32B 31/00

[52] U.S. Cl. .................................. 156/60; 156/273.3; 156/275.7; 156/380.9; 427/268.2; 427/385.5; 12/142 T; 34/39; 34/4

[58] Field of Search ............... 156/272.2, 273.3, 273.5, 156/275.3, 275.7, 307.3, 308.2, 308.6, 309.9, 307.5, 320, 379.9, 497, 499, 556, 560, 578, 94, 380.9, 60; 427/207.1, 208.2, 385.5, 55, 372.2; 12/33.2, 1 A, 146 B, 142 T; 34/39, 17, 68, 60, 4; 36/19.5

[56] References Cited

U.S. PATENT DOCUMENTS

| | | | |
|---|---|---|---|
| 2,395,133 | 2/1946 | Mahoney et al. | 156/94 X |
| 3,315,380 | 4/1967 | Mack, III et al. | 36/19.5 |
| 4,125,522 | 11/1978 | Becker | 36/19.5 X |
| 4,336,279 | 6/1982 | Metzger | 34/41 |
| 4,369,536 | 1/1983 | Hanson | 12/1 A |
| 4,390,564 | 6/1983 | Kimble | 427/55 |
| 4,756,091 | 7/1988 | Van Deneud | 34/41 |
| 4,846,919 | 7/1989 | Hanson et al. | 36/19.5 X |

*Primary Examiner*—David A. Simmons
*Assistant Examiner*—Chester T. Barry
*Attorney, Agent, or Firm*—Owen J. Meegan; Aubrey C. Brine

[57] ABSTRACT

For drying coatings of solvent-based adhesive applied to shoe bottoms a through-flow drying apparatus is provided which utilises air at ambient temperature for the constant rate period (i.e. the period during which the surface of the coating is "wet"), and thereafter applies infra-red heating during the falling rate period (i.e. the period when migration of the solvent through the solid adhesive is to be achieved). In the first stage, jets of air are directed against the shoe bottom at a velocity of not less than 15 meters/second (measured at the inlets (38)), while at the heating station a plate heater (42) of a size which is larger than the area of the shoe bottom is provided. Ideally, when the shoe is removed from the apparatus, an outsole having a reactivated coating of adhesive can be located with the shoe bottom and bonded thereto, without reactivation of the shoe bottom adhesive itself. Also disclosed is a shoe support (46) for supporting shoes of a wide range of sizes with little or no need for adjustment, said support comprising a plurality of pairs of shoe-engaging rolls (60, 62, 64) between which the downwardly depending portions of the shoe last can be accommodated.

10 Claims, 5 Drawing Sheets

DRYING A COATING OF SOLVENT-BASED ADHESIVE

BACKGROUND OF THE INVENTION

This invention is concerned with a method of drying a coating of solvent-based adhesive applied to a surface of an article, e.g. a shoe.

In the drying of a layer of solvent-based adhesive applied to an article surface, the total drying time can be divided into two separate periods:

In a first period the rate of evaporation of solvent is determined by the state of the air immediately adjacent the surface, this rate being constant while the surface remains "wet". Thus during this period, which is referred to as the "constant rate period", the rate of drying depends upon the rate of removal of solvent vapour from the layer of air adjacent to the wet surface.

In the second period, the rate of removal of solvent depends upon the migration of the solvent through the moist solid to the surface, the resistance to solvent transfer progressively increasing and thus reducing the drying rate. Thus during this period, which is referred to as the "falling rate period", the controlling factor is the rate of vapour diffusion through the solid.

While it is of course possible to allow the solvent to evaporate off naturally, it is usual for force-drying to take place in order to accelerate the rate of evaporation/drying. To this end, the surface to which the adhesive has been applied may be heated, e.g. by radiant heaters; alternatively, the surface may be subjected to hot air which in passing over the article surface serves also to remove solvent-laden air from adjacent to it. In any event, it is generally considered that heat is desirable in both the constant rate period and the subsequent falling rate period, the amount of heat supplied being dependent upon the amount of time which can be allocated to the drying process.

It will of course be appreciated that use of heat in this way is expensive in sofar as either the energy costs are high if the air is not re-circulated, or, if the air to be re-circulated, then a more complicated apparatus is required, usually also involving thermal insulation panels, as well as a system for removing solvent from the now solvent-laden air.

OBJECT OF THE INVENTION

It is the object of the present invention to provide an improved method of drying a coating of solvent-based adhesive in which, without significant disadvantage in terms of time requirements, significant savings can be made in energy consumption and overall cost.

SUMMARY OF THE INVENTION

The invention thus provides, in one of its several aspects, a method of drying a coating of solvent-based adhesive applied to a surface of an article, comprising supporting the article with the surface thereof to which adhesive has been applied exposed, directing one or more jets of air at ambient temperature through an inlet or inlets therefor towards said surface of the article, in a direction extending normally, or substantially normally, to said surface, such that the apical region of the or each jet impinges on the surface, for a period determined according to the period during which the rate of drying is calculated as being constant, or substantially constant, for the particular adhesive coating, and thereafter heating said surface of the article for a further period during which drying of the adhesive coating continues, said period being determined according to the rate at which drying continues but being terminated when the condition of the adhesive coating is such that bonding of said surface to an attachment surface can be effected.

The phrase "air at ambient temperature" where used herein is to be understood as referring to ambient air, i.e. air drawn from the surrounding region, which is not passed through or otherwise subjected to any heating arrangement specifically intended to heat it. It is recognized that by reason of some of the air being drawn beneath the infra-red heater arrangement provided for effecting the further drying period (or second, heating, stage) some increase in the temperature thereof may be occasioned, and in addition, if the air is re-circulated but with a proportion thereof bled off, such proportion being replaced by further ambient air with which the re-circulating air thus becomes mixed, the temperature of the mixture will, over an extended period, show some increase over the temperature of the ambient air, but in each of these cases such increases are inconsequential and insignificant as compared with conventional processes in which air is heated for the purpose of drying adhesive, and the phrase "air at ambient temperature" where used herein is thus intended also to refer to air the temperature of which exhibits such an inconsequential increase over ambient temperature.

It will thus be appreciated that, using the present invention, the drying which takes place during the constant rate period is achieved without the provision of heaters, the requirement for heat being reserved merely for the falling rate period, for which purpose a suitable infra-red heater can be provided. In practice, using a method as set out above it has been found that coatings of solvent-based adhesive applied to a shoe bottom can be dried in a period of less than 2½ minutes, at a cost in terms of energy consumption which is significantly smaller than with current available force-drying apparatus.

In a preferred embodiment of apparatus described hereinafter the drying air is re-circulated (subject to a proportion being constantly removed for preventing a build-up of solvent in the re-circulating air). Using such an apparatus, it has been found that, as already mentioned above, during the course of a working day the temperature of the re-circulating air may be raised above room temperature merely as a result of the application of heat during said further drying period but, nevertheless the need for complicated and expensive thermal insulation to retain the heat (regarded as necessary in previous apparatus) is avoided in carrying the method according to the present invention.

In carrying out the method in accordance with the invention the article is preferably moved progressively along a path firstly passed a plurality of air inlets and thereafter past a heating arrangement. By this progressive system, utilising a continuous conveyor arrangement, the articles can readily be moved from a loading to an unloading position via the air-blowing and heating positions, thus, at the same time enhancing the work flow.

The heating arrangement preferably comprises a plate heater having a continuous planar heating surface by which infra-red radiation is emitted, the heater being of greater dimensions, both widthwise and lengthwise, than the shoe bottom so that the radiation is spread substantially uniformly over the surface of the shoe bottom despite variations in the distance of the shoe bottom from the heater by virtue of the heightwise contour of the shoe bottom. Further, by the selection of a suitable band of wavelengths emitted by the heater, it can be ensure that the energy is strongly absorbed by the material of which the shoe upper is made, regardless of its colour, without the need to adjust the output of the heater. The heater may be a metal plate, e.g. an aluminium plate, in which heaters are embedded, or alternatively may be made up of ceramic blocks in which heaters are accommodated. The surface temperature of the plate heater is preferably in the range of 450°-500° C.

In the initial drying period the velocity of the air jet(s) is not less than 15 metres/second, preferably at least 17 metres/second, (measured at the air inlet(s)), the arrangement being such that the apical region of the or each jet impinges on the article surface, whereby maximum turbulence is achieved at the article surface, thus ensuring removal of the layer of stagnant air which otherwise would tend to lie adjacent to the article surface and act as a barrier to the solvent evaporation.

The invention further provides, in another of its several aspects, a method of bonding a shoe sole to the bottom of a lasted shoe, wherein adhesive is applied to the shoe bottom and is dried using a method as set out above, during which drying an adhesive coating previously applied to an attachment surface of the shoe sole is activated, whereafter the attachment surface of the shoe sole and the shoe bottom surface to which adhesive has been applied are brought into a desired location with one another and held pressed together until a bond therebetween is consolidated. It will be noted that in carrying out such a method, there is no requirement for the adhesive coating on the shoe bottom to be reactivated, since the condition of the adhesive coating can readily be controlled so that the shoe bottom is presented in the correct condition for bonding.

The invention also provides, in another of its several aspects, drying apparatus suitable for use in drying a coating of solvent-based adhesive applied to a surface of an article, comprising a chamber comprising an air-blowing station and a heating station, a support arrangement for supporting an article with the surface thereof to which adhesive has been applied exposed, and drive means for moving the support arrangement to bring an article supported thereby successively from a loading station through the air-blowing and heating stations to an unloading station, wherein the air-blowing station comprises one or more air inlets for directing air towards said surface of an article in a direction extending normally, or substantially normally, to said surface, together with means for drawing air from the region surrounding the apparatus, and thus at ambient temperature, and blowing it through the air inlet(s) so that one or more jets of air impinge on the surface of the article, and further wherein the heating station comprises a heating arrangement for directing infra-red radiation towards said surface of an article, the air-blowing and heating stations being so arranged within the chamber that the air-drawing means is effective to draw air from the region surrounding the apparatus through the heating station in a direction towards the air-blowing station.

By drawing air through the heating station as aforesaid, it will be appreciated, the flow of air from the air-blowing station to the heating station is inhibited and the risk of ignition and/or explosion of solvent-laden air passing through the heating station is mitigated. In order further to reduce any risk of ignition and/or explosion, however, the heating station is provided with a plurality of baffles arranged between the support arrangement and the heating arrangement, said baffles serving to concentrate the heat applied by the heating arrangement to the exposed surface of an article supported by the support arrangement, and at least one of said baffles extending transversely of the flow of air being drawn through the heating station by the air-drawing means thus to divert such flow from the heating arrangement towards the article surface.

As already stated, the baffles also serve to improve the heating effect while enabling the heating arrangement itself to be located further from the article surface than would otherwise be the case.

The support arrangement of the apparatus preferably comprises a plurality of article supports, so that articles supported thereby can be moved progressively through the chamber in a continous flow. One shoe support suitable for use in an apparatus as set out above, furthermore, is adapted to support, bottom uppermost, a shoe comprising a shoe upper on a last and an insole on the last bottom, and comprises a plurality of pairs of support members each providing an arcurate shoe-engaging portion, the members of each pair being arranged spaced apart from one another for receiving part of a shoe therebetween, wherein the members of at least one of said pairs are mounted for movement between first and second pre-set shoe-engaging positions whereby shoes of different sizes can be accommodated in the support.

Preferably each support member comprises a roll of resilient material, and the movably mounted members are each mounted on an arm for pivotal movement between the two pre-set positions.

In a preferred embodiment of such shoe support, three pairs of support members are provided spaced from one another so as to accommodate a shoe along its length from the ball region to the heel end thereof, the middle one of said three pairs comprising the movably mounted support members. In this way, shoes of significantly different shapes and sizes may all be accommodated by the shoe support, from a small children's shoe to a large men's shoe, the middle one of the three pairs serving to support the heel end of the last in the case of a children's shoe and an instep region of the last in the case of a men's or ladies' shoe.

There now follows a detailed description, to be read with reference to the accompanying drawings, of one method and one apparatus (including a shoe support) in accordance with the invention. It will of course be appreciated that this method and this apparatus have been selected for description merely by way of exemplification of the invention and not by way of limitation thereof.

DESCRIPTION OF THE PREFERRED EMBODIMENT

Figure 1:
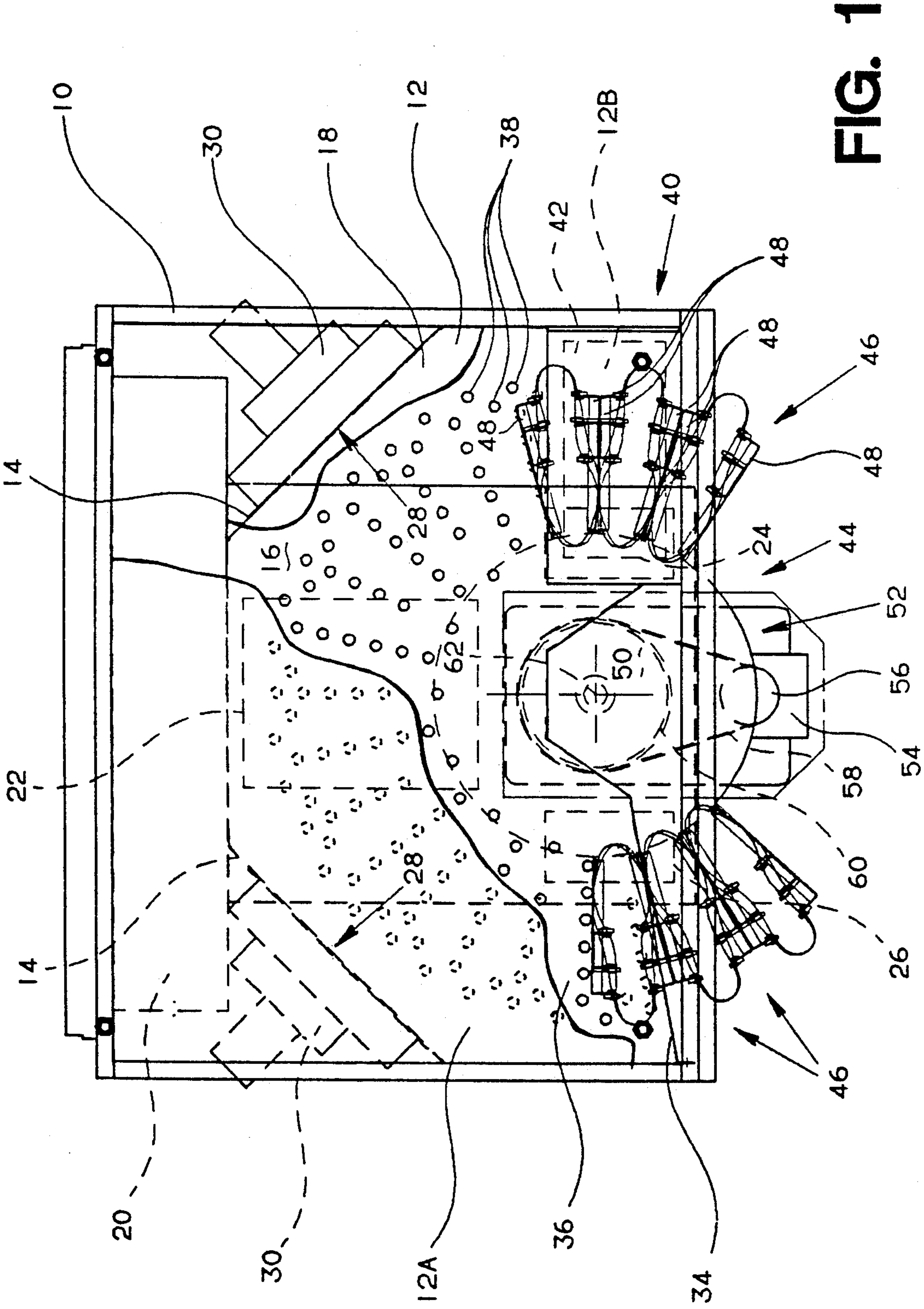
FIG. 1 is a plan view of an apparatus for carrying out the method in accordance with the invention.

The apparatus in accordance with the invention now to be described is suitable for use in drying a coating of solvent-based adhesive applied to the bottom of a shoe for the subsequent attachment of an outsole thereto. Thus, the apparatus comprises a box-like structure 10 within which is provided a chamber 12 which is generally rectangular, but the rear "corners" of which are cut across by inclined side plates 14. Arranged above the chamber 12 is a plenum chamber 16 to which air is supplied by a fan unit 18 through a funnel-shaped conduit 20 arranged at the rear of the chamber. The fan 18 draws air from within the chamber 12 via a port 22 situated to the rear of the chamber, and also through further ports 24, 26 arranged towards the front of the chamber, which is open to atmosphere. Thus, a proportion of the air which is drawn in by the fan unit 18 will be solvent-laden, while a further proportion will be from the area surrounding the apparatus and will be relatively solvent-free. The chamber is also provided with two exhaust ports 28, one arranged in each of the wall portions 14, with each of which also is associated a fan unit 30. Thus, in the operation of the apparatus, solvent-laden air is progressively "bled" off from the chamber and is replaced by the relatively solvent-free air.

The chamber 12 comprises an air-blowing station 12A and a heating station 12B. At the air-blowing station 12A, the base of the plenum chamber 16 is constituted by a perforated plate 36, the perforations 38 of which constitute air inlets through which jets of air are directed into the chamber 12 at the air blowing station thereof. At the heating station 12B said base plate is solid and supports, on the under-side thereof, a heater arrangement generally designated 40.

Figure 2:
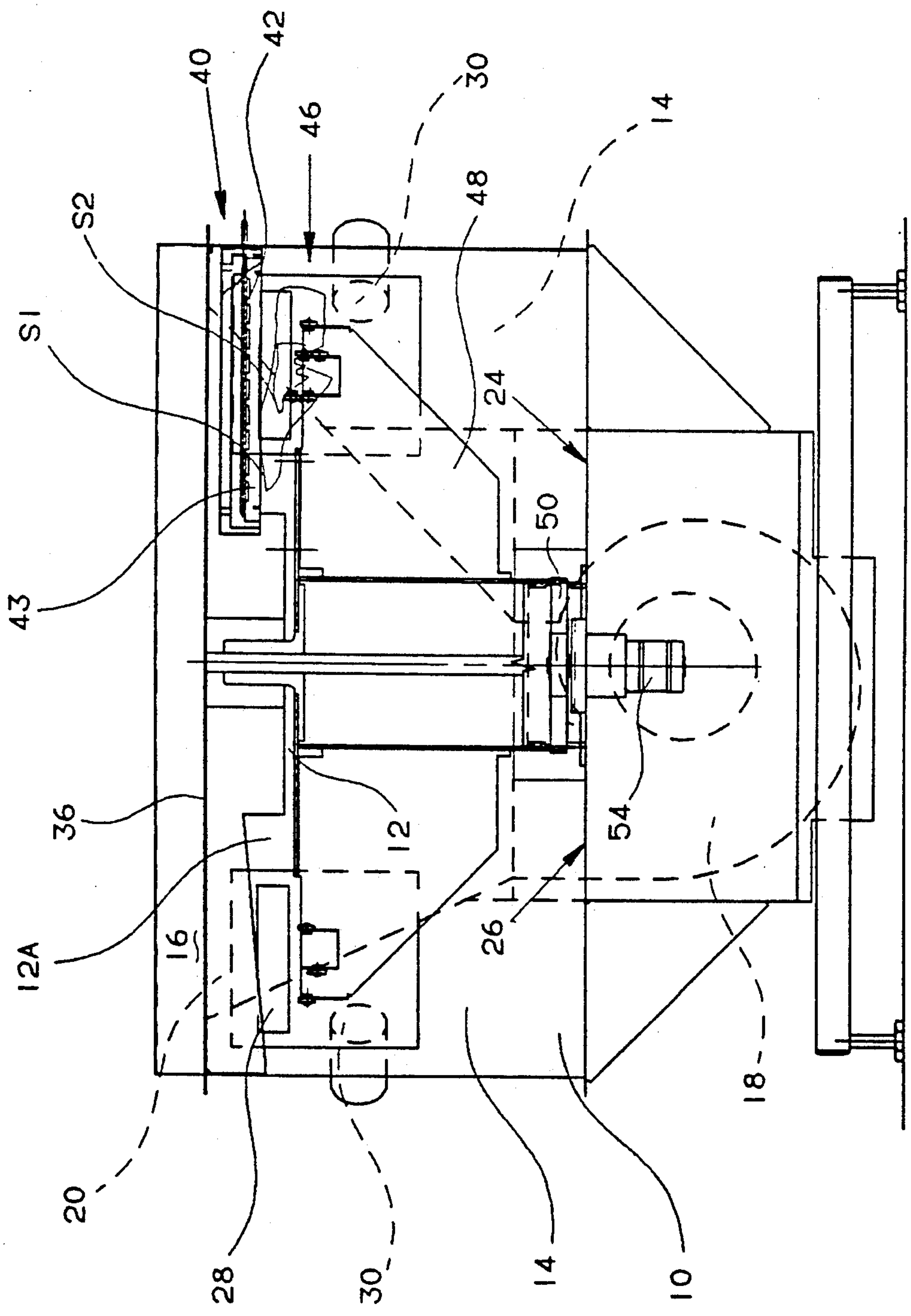
FIG. 2 is a front elevation of said apparatus.

The heating station 12B of the apparatus is, as can be seen from FIG. 2, arranged adjacent the open front of the chamber 12. Thus, as ambient air is drawn from the area surrounding the apparatus by means of the fans 18, 30, it passes through the heating station 12B in a direction towards the air-blowing station 12A, thereby militating against any risk of ignition and/or explosion by direct contact of solvent with the heater arrangement 40, and also serving to inhibit the passage of any air which is solvent-laden from the air-blowing station 12A into the heating station 12B.

The heater arrangement 40 comprises a plate-type heater 42 which is made up of a plurality of ceramic blocks in which electrical heaters are embedded. The plate heater 42 is thus adapted to emit infra-red radiation and thus heat the shoe bottom presented thereto at a temperature which is substantially uniform over the whole of the surface of the shoe bottom. In the apparatus being described, the surface temperature of the plate heater 42 should be in the order of 450°–500° C. Arranged beneath the plate heater 42, furthermore, is a plurality of (in this case nine) baffles 43 extending transversely of the flow path of the air being drawn past the heating station 12B. The baffles 43 are effective not only to act as channels for the heat emitted by the plate heater 42, concentrating it on the coated surfaces of the shoes presented to the heating station, but also act to divert the air passing through the station away from the surface of the plate heater 42, thus still further enhancing the mitigation of risk of ignition and/or explosion of the solvent by contact with the heater surface.

The apparatus further comprises a support arrangement generally designated 44 comprising a plurality of shoe supports generally designated 46 for supporting, bottom uppermost, shoes S comprising a shoe upper on a last and an insole on the last bottom. The support arrangement 44 thus comprises a plurality of (in casu twenty two) shoe supports 46, each of which is carried by an inclined arm 48 in the form of two adjacent plates, mounted on a rotating support plate 50. The plate 50 is driven by drive means generally designated 52 and comprising a motor 54 by which a pulley 56 is driven, said pulley being connected by a belt 58 to a further pulley 60 carried by a shaft 62 on which the plate 50 is supported. Thus, when the drive means 52 is operating, and this is continuous in the operation of the apparatus, the support arrangement is driven so as to move the shoe supports 46 supported thereby progressively through the chamber 12. Suitable operator-actuatable control means is also provided for enabling the operation of the drive means to be controlled, whereby the time required for a shoe to pass through the chamber can be set by the operator.

Each shoe support 46 supported by the support arrangement 44 comprises a plurality of (in casu three) pairs of support members, in the form of rolls 60, 62, 64 of a resilient material, e.g. silicon rubber. The first and third pairs of rolls 60, 64 are each mounted on rigid lug portions 66, 68 carried by the plates forming the support arms 48, the rolls of each pair being so spaced as to receive therebetween a downwardly depending portion of a shoe S for supporting it. Each roll thus provides an arcuate shoe-engaging portion, so that shoes of different widths can readily be accommodated therebetween as aforesaid.

Figure 4:
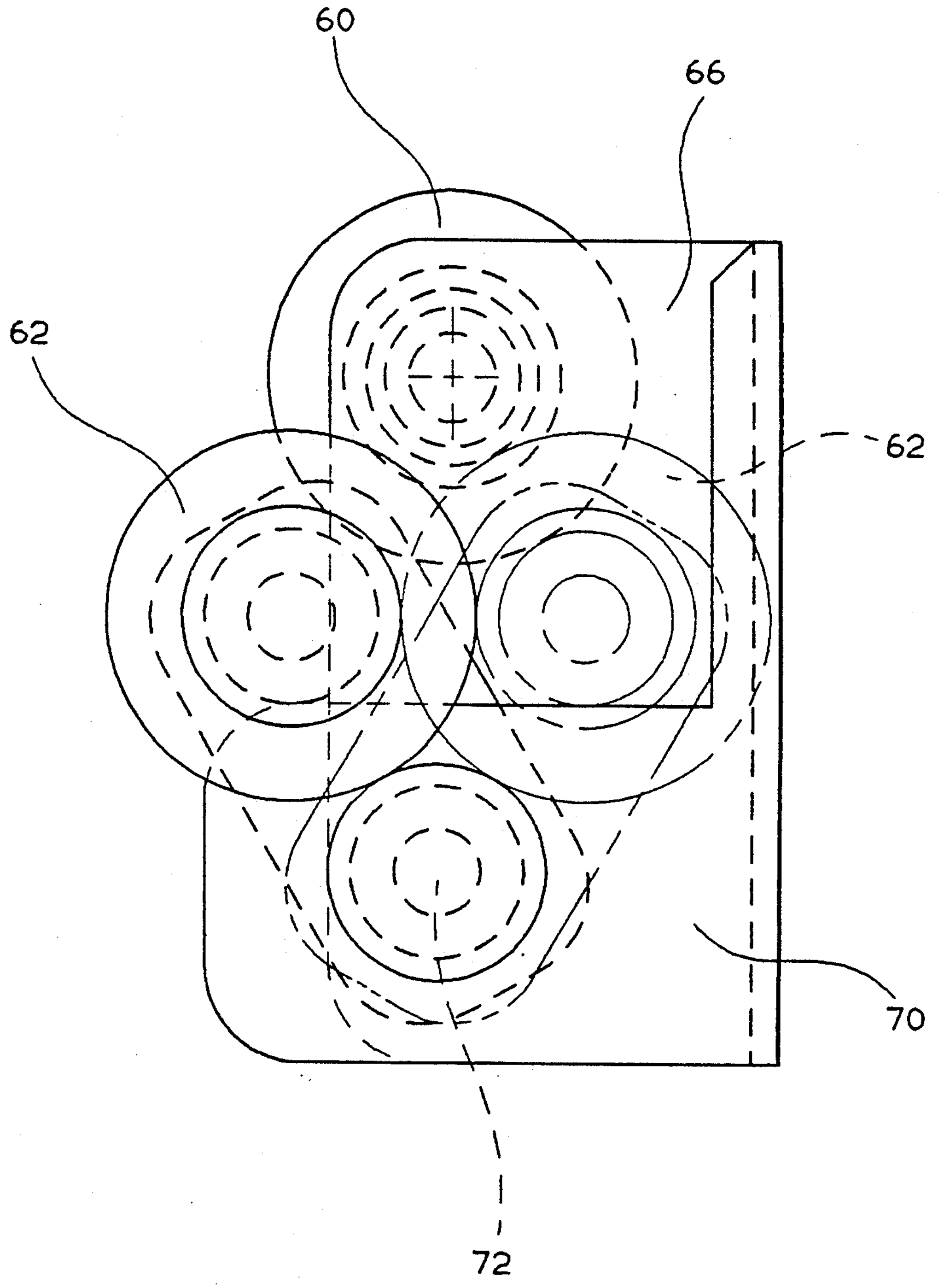
FIG. 4 is a fragmentary view along the line IV—IV of FIG. 3.
Figure 5:
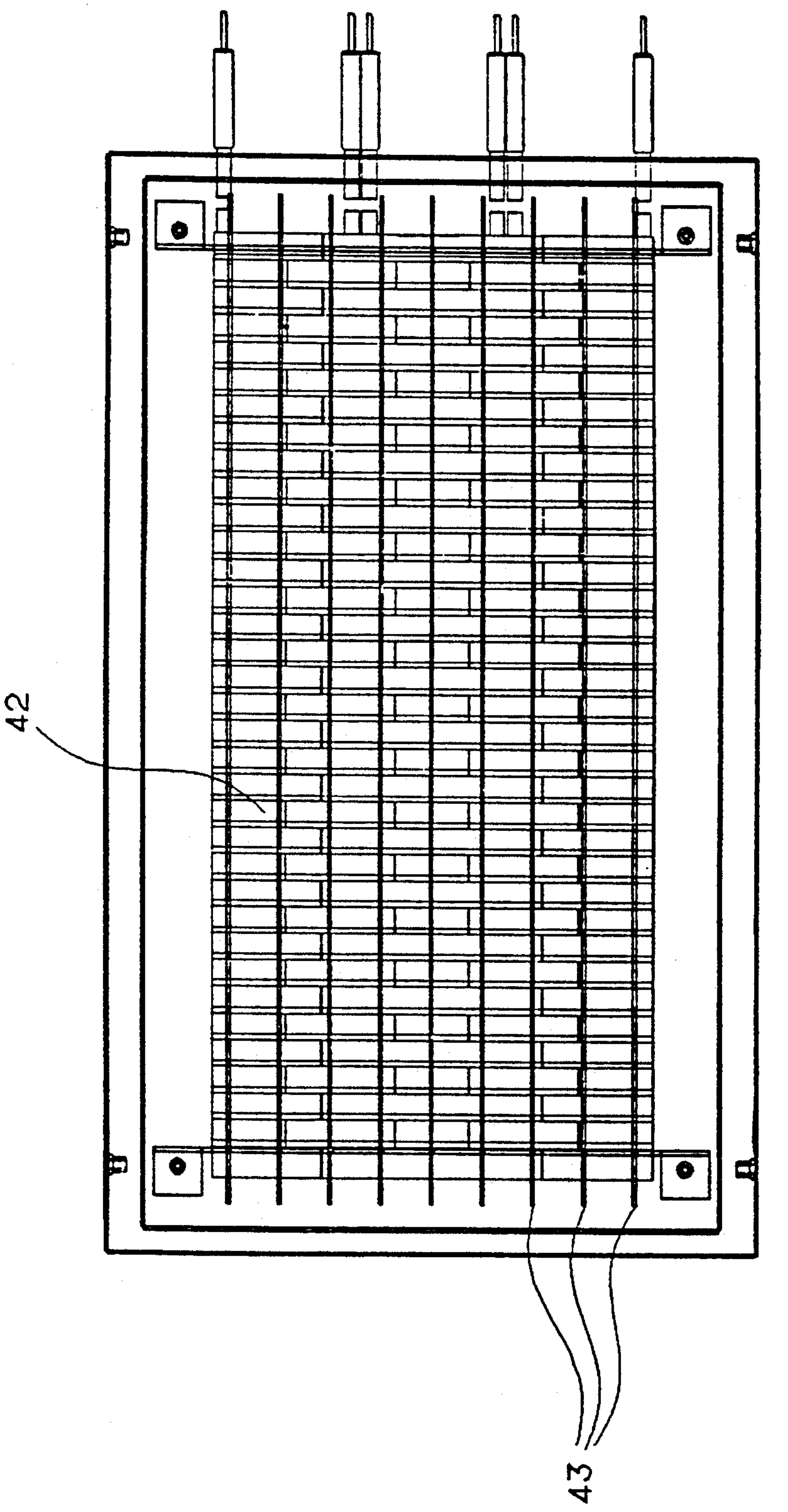
FIG. 5 is an underneath plan view of a heater arrangement of the apparatus.

The middle pair of rolls 62 are mounted, also on lug portions 70 on said plates, for pivotal movement, about an axis 72, betweeen first and second positions (shown respectively in full and chain line in FIG. 4) whereby to vary the distance between the shoe-engaging portions of the rolls. These two positions of the rolls 62 are determined by engagement of the support pin thereof with abutment surface portions provided on the lug portions 70, the arrangement being such that engagement of a roll by the shoe will not dislodge it from the position in which it has been set by the operator.

Figure 3:
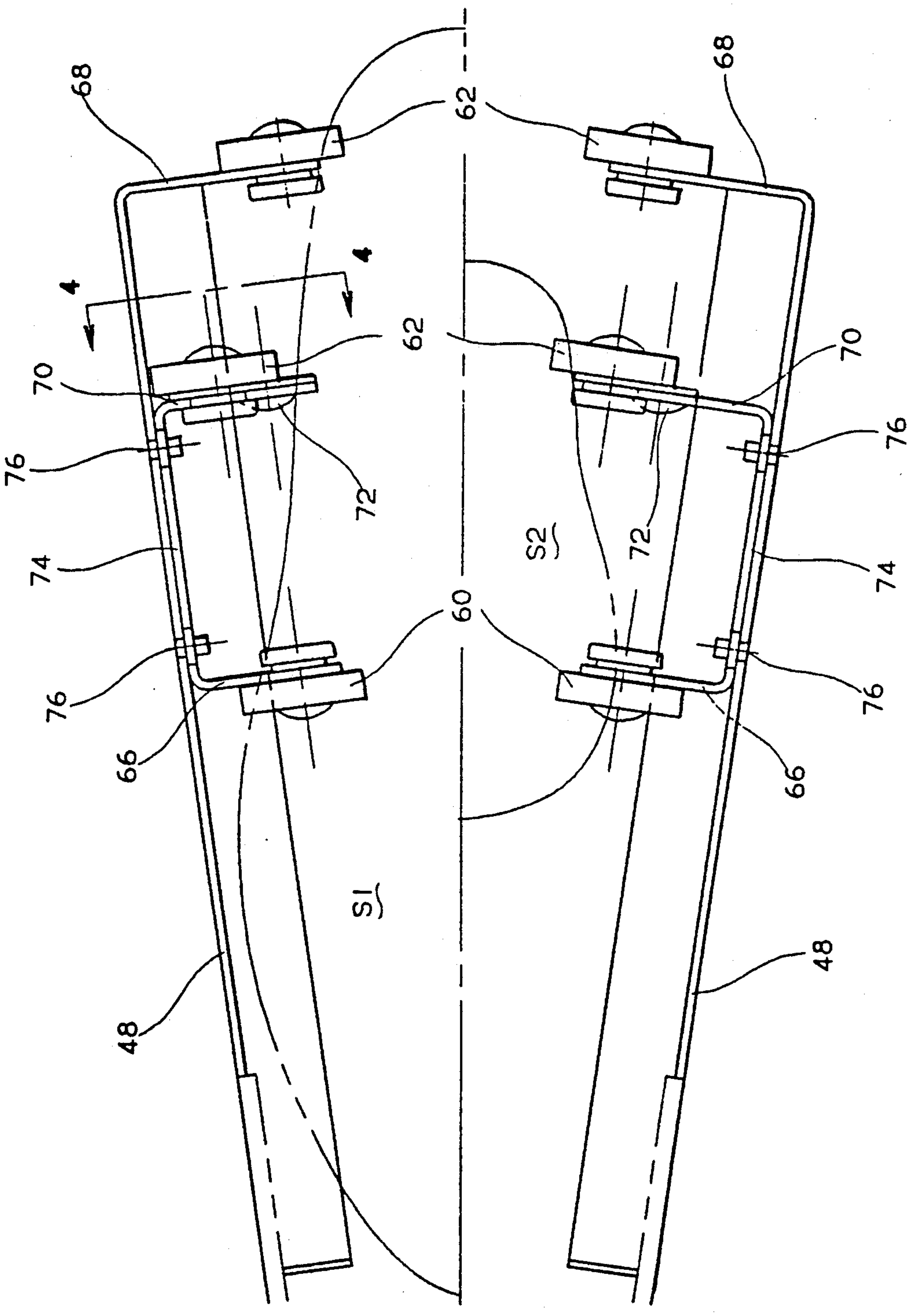
FIG. 3 is a detailed view in plan of a shoe support forming part of said apparatus.

As shown in FIG. 3, the shoe support in accordance with the invention can accommodate shoes of a wide range of sizes, a men's shoe S1 and also a children's shoe S2 being shown in that Figure. It will also be appreciated from FIG. 3 that, for the men's shoe the middle rolls 62 must be in their outward position (shown in full line in FIG. 4) and support the last just forwardly of the break thereof (instep region), while for the children's shoe the middle rolls must be in their inward position (shown in chain-dot in FIG. 4) and support the cone of the heel end of the last (see also FIG. 2). In general, it will not be necessary to adjust the positon of the rolls, other than for moving the middle rolls between the two pre-determined positions as aforesaid. If further adjustment becomes necessary, however, a bracket 74 providing the lug portions 66 and 70 is supported by its plate 48 by a pin-and-slot connection 76 such that the bracket can pivot or be moved heightwise according to the particular requirement.

In carrying out the method in accordance with the invention shoes to the bottom surface of which solvent-based adhesive has been applied in a coating are supported, bottom uppermost, on the shoe supports 46 and are carried by the support arrangement 44 through the chamber 12 whereby firstly jets of air at ambient temperature are directed through the air inlets provided by the perforations 38 in the base of the plenum chamber 16, towards the shoe bottom surface in a direction extending normally, or substantially normally, to said surface, such that the apical region of each jet impinges on said surface. To this end, the velocity of the jets is not less than 15 metres/second, preferably at least 17 metres/second (measured at the air inlets 38) and the distance of the air inlets from the shoe bottom surface is 115 to 160 mm. (In the apparatus described the distance of the top edges of the plates 48 from the perforated plate 18 is approximately 160 mm and the diameter of each air inlet is 20 mm.) .

The speed at which the support arrangement 44 rotates is such that the shoe remains beneath the perforated portion of the plate 18 for a period which is determined according to the constant rate period, i.e. the period during which the rate of drying is calculated as being constant, or substantially so, for the particular adhesive coating. This will of course depend upon the thickness of the coating, which in conventional practice in a shoe factory is of the order of 1.0 mm or less.

At the end of the constant rate period, the shoe passes on its support 46 to the heating station 12B, at which it passes beneath the plate heater 42 for a further period determined according to the falling rate period for the particular adhesive coating. It should be appreciated, however, that this drying period is terminated before completion, viz. when the condition of the adhesive coating is such that bonding of the shoe bottom surface to an attachment surface of an outsole can be effected without re-activation of the coating on the shoe bottom.

In practice, it has been found that for a polyurethane-based adhesive of a type conventionally used in the shoe-making industry, an overall period of 2–2½ minutes is adequate for satisfactorily drying a coating with a dry weight of 10.5 mg per sq.cm.. By virtue of the construction of the apparatus, furthermore, approximately 85% of the drying time is in the air-blowing station and the remaining 15% at the heating station.

If desired, the apparatus in accordance with the invention can advantageously be arranged in a line within the shoe factory, which lines starts with a bottom roughing operation following by a bottom cementing operation, from which the shoe is loaded into the apparatus. At the end of the drying operation the operator takes an outsole, having a coating of adhesive which has been re-activated at the same time as the shoe is being dried as aforesaid, and locates it accurately with the shoe when removed from the drying apparatus. This assembly of shoe and outsole is then placed in a sole attaching press for a period until a bond is consolidated therebetween.

I claim:

1. A method of bonding a shoe sole to the bottom of a lasted shoe which includes the step of drying a coating of solvent-based adhesive applied to a bottom surface of a shoe by supporting the lasted shoe having a coating of solvent-based adhesive applied to the bottom surface thereof, with the bottom surface thereof to which adhesive has been applied exposed;

directing at least one jet of air at ambient temperature through an inlet therefor towards said surface such that the apical region of said jet impinges on the surface for so long as the rate of drying is substantially constant for the adhesive coating, and thereafter heating the surface to which adhesive has been applied for a further period for so long as drying of the adhesive coating continues, said heating period being determined according to the rate at which drying continues but being terminated when the condition of the adhesive coating is such that bonding of said surface to an attachment surface can be affected; and during said drying step activating an adhesive coating previously applied to an attachment surface of the shoe sole, whereafter the attachment surface of the shoe sole and the shoe bottom surface to which adhesive has been applied are brought into a desired location with one another and held pressed together until a bond therebetween is consolidated.

2. A substantially two stage method of drying a coating of solvent-based adhesive to a surface of an article, comprising:

supporting the article with the surface thereof to which adhesive has been applied exposed; and in an air drying stage directing at least one jet of air at ambient temperature through an inlet therefor towards the surface of the article, in a direction extending substantially normally to the surface, such that the apical region of said jet impinges on the surface, for so long as the rate of drying is substantially constant for the adhesive coating, and thereafter employing a heating arrangement in a heat drying stage for heating the surface of the article to which adhesive has been applied for a further period for so long as drying continues but being terminated when the condition of the adhesive coating is such that the bonding of the surface to an attachment surface can be affected.

3. Method according to claim 2 wherein the article in the drying stage is moved progressively along a path firstly past a plurality of air inlets and thereafter in the heat drying stage past a heating arrangement.

4. Method according to claim 3 wherein the velocity of said at least one jet of air is not less than 15 metres/-second measured at the air inlet.

5. Method according to claim 2 wherein the heating arrangement comprises a plate heater having a continuous planar surface by which infra-red radiation is emitted.

6. Method according to claim 5 wherein the surface temperature of the plate heater is in the range 450°–500° C.

7. Method according to claim 3 wherein during said heating stage air is caused to flow between the heating arrangement and the article, a plurality of baffles being provided, including at least one baffle extending transversely away from the heating arrangement and towards the surface of the article.

8. Method according to claim 5 wherein the article in the air drying stage is moved progressively along a path firstly past a plurality of air inlets and thereafter in the heat drying stage past said heating arrangement.

9. Method according to claim 8 wherein during the heating of the article air is caused to flow between the heating arrangement and the article, a plurality of baffles being provided, including at least one extending transversely of the air flow, whereby the air flow is diverted away from the heating arrangement and towards the surface of the article.

10. Method according to claim 2 wherein the velocity of the jet of air is not less that 15 metres/ second measured at the air inlet.

* * * * *